United States Patent [19]

Chow

[11] Patent Number: 4,702,052
[45] Date of Patent: Oct. 27, 1987

[54] PRESTRESSED CONCRETE PRESSURE VESSEL AND METHOD FOR MAKING SUCH A VESSEL

[75] Inventor: Philip Y. Chow, Orinda, Calif.

[73] Assignee: T. Y. Lin International, San Francisco, Calif.

[21] Appl. No.: 921,942

[22] Filed: Oct. 20, 1986

[51] Int. Cl.⁴ .................... E04C 3/293; E04C 5/08
[52] U.S. Cl. ................................ 52/224; 29/452; 264/32; 264/228; 376/296
[58] Field of Search .................. 52/224; 376/296; 29/452; 264/32, 228

[56] References Cited

U.S. PATENT DOCUMENTS

| | | | |
|---|---|---|---|
| 2,326,010 | 8/1943 | Crom | 264/228 |
| 3,260,020 | 7/1966 | Patin | 52/224 X |
| 3,293,139 | 12/1966 | Bellier | 52/224 X |
| 3,683,574 | 8/1972 | Vaessen | 52/224 |
| 4,265,066 | 5/1981 | Lin et al. | 52/224 |
| 4,389,825 | 6/1983 | Chow | 52/224 |

FOREIGN PATENT DOCUMENTS 1962177  6/1971  Fed. Rep. of Germany ........ 52/224

Primary Examiner—Alfred C. Perham
Attorney, Agent, or Firm—Owen, Wickersham & Erickson

[57] ABSTRACT

A pressure vessel and a method for distributing the stresses in a thick-walled high-pressure vessel, so that they lie within allowable limits, by constructing the wall in a series of generally concentric layers, at least one intermediate layer of which is to be constructed before the other layers. The intermediate layer is constructed above a base, resting on it through a sliding joint. Then it is placed under an external prestressing pressure. Thereafter, that layer is secured to the base by a rigid concrete connection. The remaining layers of the wall are then constructed and are subjected to an external prestressing pressure. Preferably, stress-relieving slots are applied to the innermost layer, during its construction.

6 Claims, 7 Drawing Figures

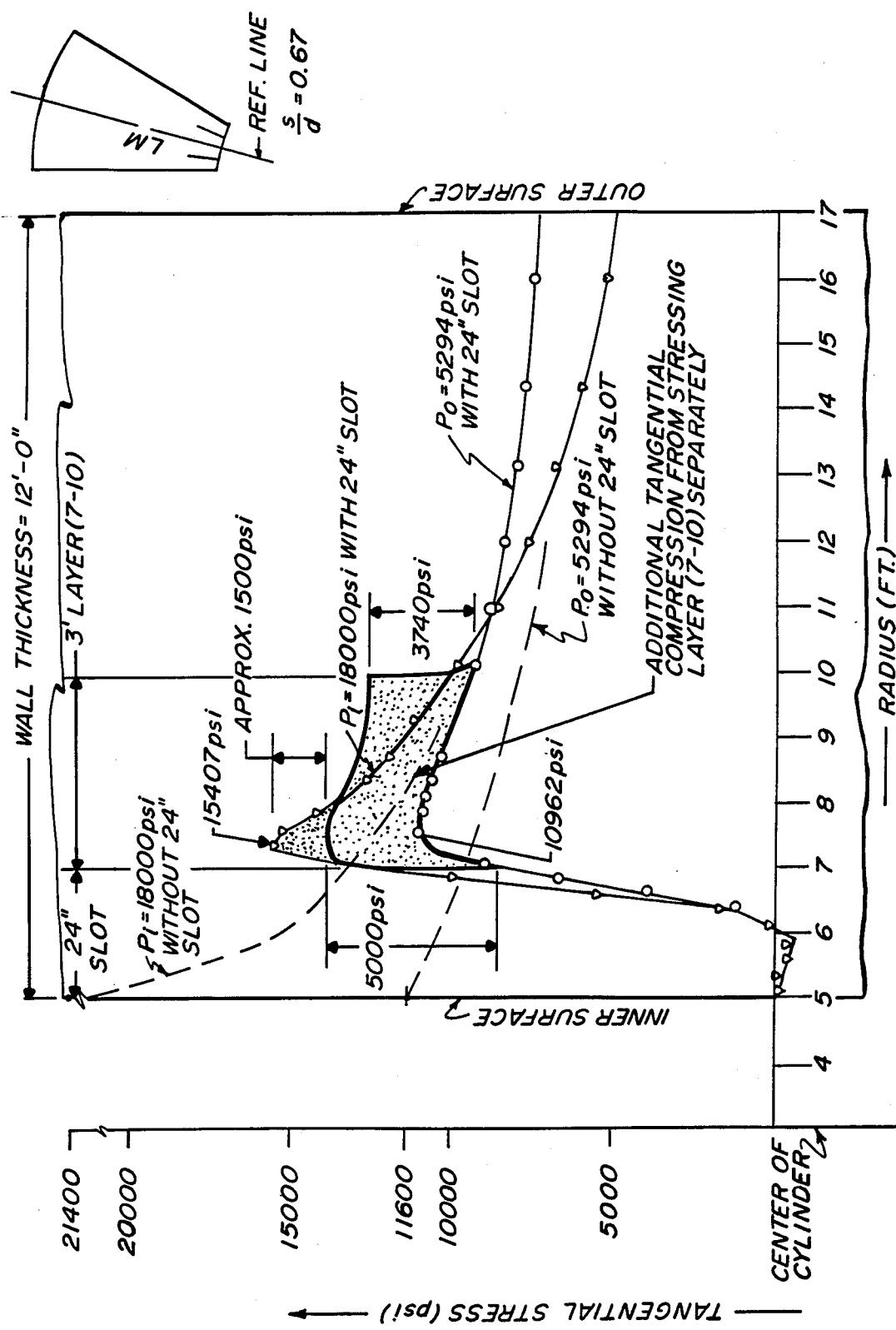
FIG. 4 TANGENTIAL STRESS DISTRIBUTION, WITH 24" SLOTS AT 15°

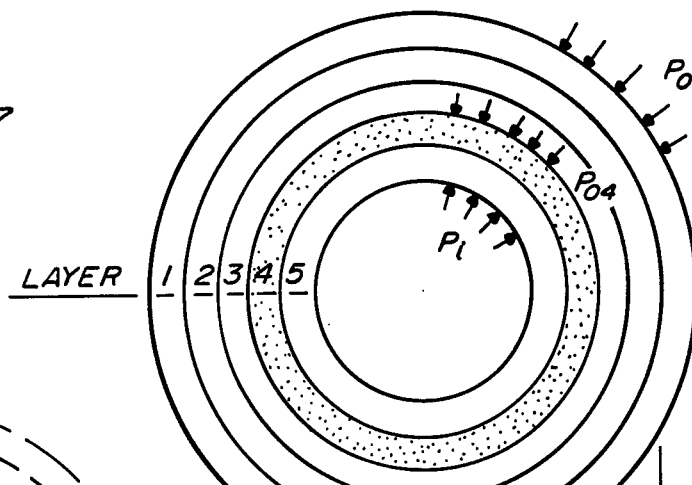
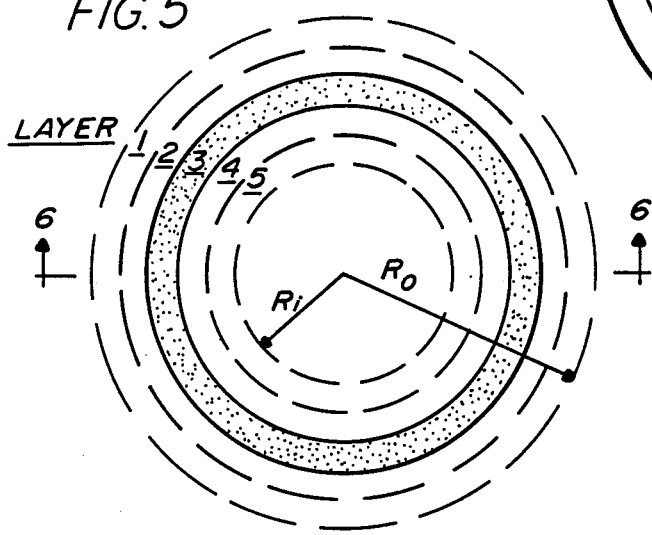
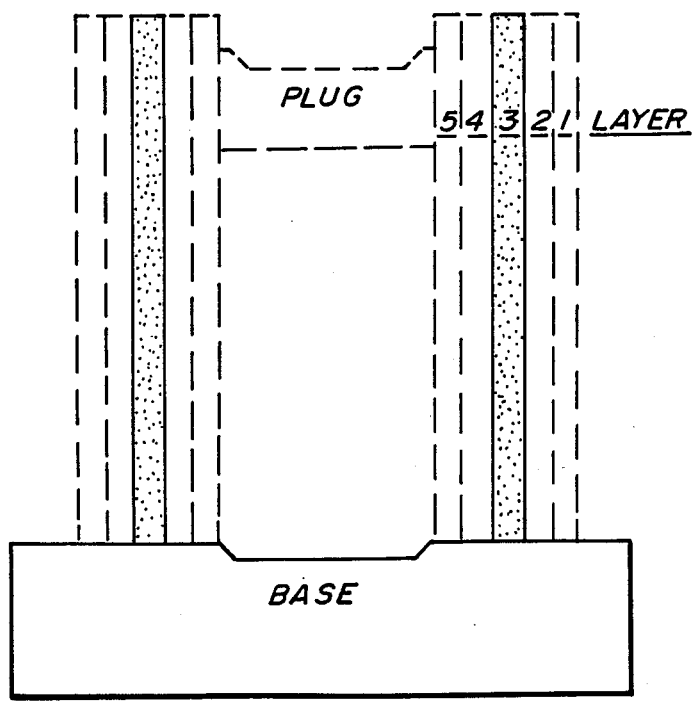
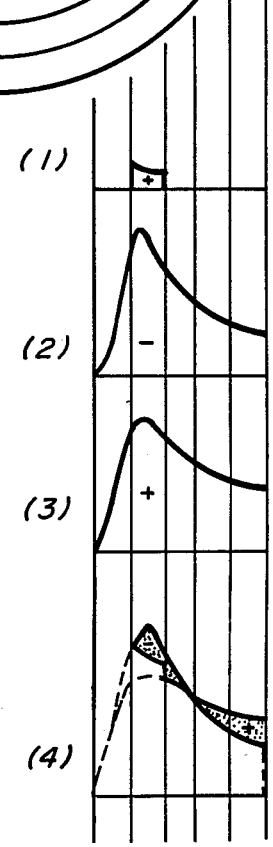

PRESTRESSED CONCRETE PRESSURE VESSEL AND METHOD FOR MAKING SUCH A VESSEL

This invention relates to a thick-wall high-pressure vessel and to a method for making such a vessel.

BACKGROUND OF THE INVENTION

The invention is an improvement over U.S. Pat. No. 4,389,825, which issued June 28, 1983. That invention employed a stress-relieving slot (SRS) to increase the pressure-resisting capacity of a prestressed concrete pressure vessel (PCPV).

The application of external prestressing causes tangential stress in a pressure-vessel wall to peak at the inner surface. This peak stress controls the design of the vessel and limits its capacity. If the peak stress at the inner surface is moved toward the center of the wall, where the allowable concrete stress can be enhanced due to the confined state of the concrete, the capacity of the same vessel is also increased. The purpose of the invention of U.S. Pat. No. 4,389,825, the stress-relieving slot method, was to achieve this by accomplishing the following:

1. Lower the peak tangential compressive stress (TCS) the inner surface due to circumferential prestressing $P_0$ on the exterior surface, and
2. Move this peak stress to the inside of the wall, concrete strength is enhanced due to the confinement of concrete.

The ASME Code allows an increase of up to 2.7 times the normal concrete strength when the concrete is confined. Thus, theoretically, if concrete of 5,000 psi strength is used in the construction of a thick-walled PCPV, it can be stressed up to 13,500 psi at or near the wall center where the concrete confined.

The prestressed concrete pressure vessel or PCPV is stressed externally or in the external region of the cylindrical wall in order to produce tangential compressive stress or TCS in the wall, with which to counter, and neutralize if possible, the tangential tensile stress (TTS) which takes place when internal pressure $P_i$ is introduced in the cavity within the vessel. The design aim of the U.S. Pat. No. 4,389,825 was therefore to match the relocated peak TCS the wall due to $P_0$, with the TTS due to $P_i$. The distribution of both stresses assumes more or less the same form across the wall. Any difference between the two should not be so large that it would require a large amount of tangential reinforcement in a wall. Excessive reinforcement and steel congestion is undesirable, even impractical, depending on the amount of the excess.

However, the effectiveness of the method of U.S. Pat. No. 4,389,825 was limited because the depth into the wall which peak stress could be moved was a function of the depth of the slots. The slots themselves were limited in depth, because they reduced the effective structural depth of the wall.

An object of the present invention is to close the gap between the TCS and TTS stresses.

Whereas the earlier method utilized only vertical radial slots on the inner surface of the cylindrical pressure vessel to force the peak tangential stress to move toward the center of the wall, the present invention adds to that structure a new layered construction.

SUMMARY OF THE INVENTION

In the layered construction method, as its name implies, prestressed concrete pressure vessel wall is constructed in independent circular layers, one over the other, to provide the total wall thickness. The layers may be constructed and prestressed in any sequence to produce the desired distribution of tangential stress.

While a type of layered construction has been used for steel pressure vessels, there has been no development for applying such a technique to prestressed concrete vessels.

In the layered construction method of this invention the intensity and distribution of the stress across the wall can be manipulated by varying the amount of prestressing on each layer. This new method, therefore, provides the designer with a system for controlling the stresses and for making more efficient use of the materials in the wall.

While layered construction per se is not able to solve the problems of a thick-walled PCPV completely, it provides means for controlling the distribution of tangential compressive stresses across the wall due to $P_0$ and for matching the distribution of tangential tensile stresses generated by $P_i$. Thus, the use of stress-relieving slots and the layered construction method are complementary to each other and by using *both*, judiciously in combination, greatly improved results can be obtained.

BRIEF DESCRIPTION OF THE DRAWINGS

FIG. 4 is a graph plotting the stress curves against wall thickness for various design conditions and construction sequences.

FIG. 5 is a simplified plan view of the pressure vessel.

FIG. 6 is a simplified view in elevation and section of the vessel of FIG. 5.

FIG. 7 is a simplified plan view and a related series of stress distribution curves showing the construction sequence and stress sequences therefor.

DESCRIPTION OF A PREFERRED EMBODIMENT

Figure 1:
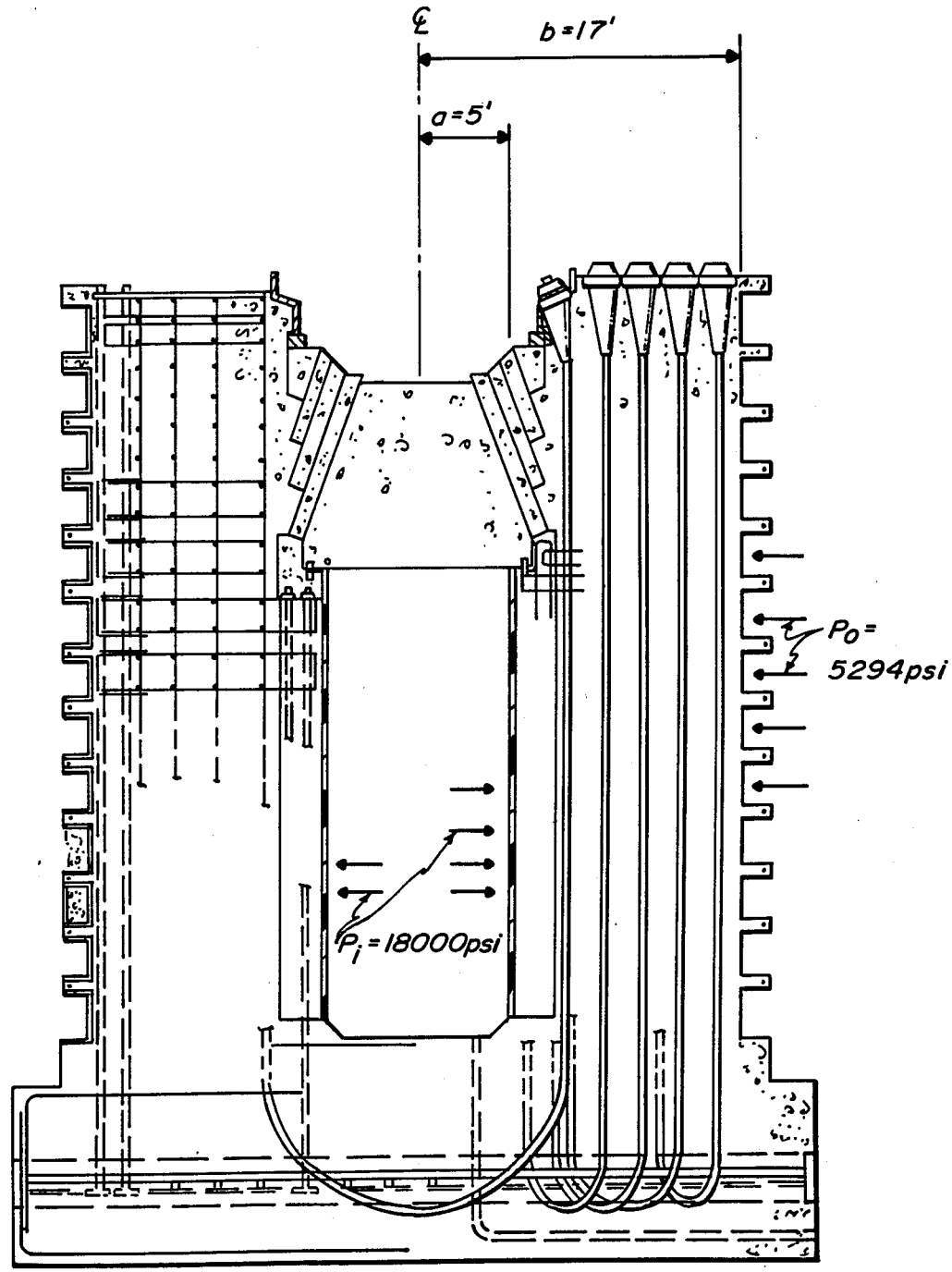
FIG. 1 is a sectional view in elevation of a prestressed concrete pressure vessel incorporating the principles of the present invention and showing some vessel dimensions by way of example, along with the values of external pressure $P_0$ and internal pressure $P_i$.
Figure 3:
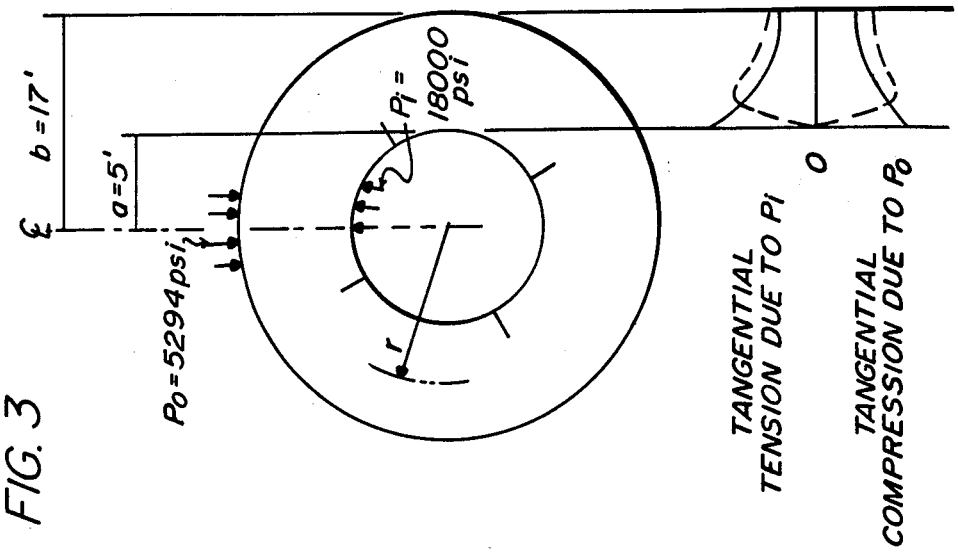
FIG. 3 is a diagrammatic representation illustrating the distribution of the TCS and TTS across a twelve-foot-thick wall.
Figure 2:
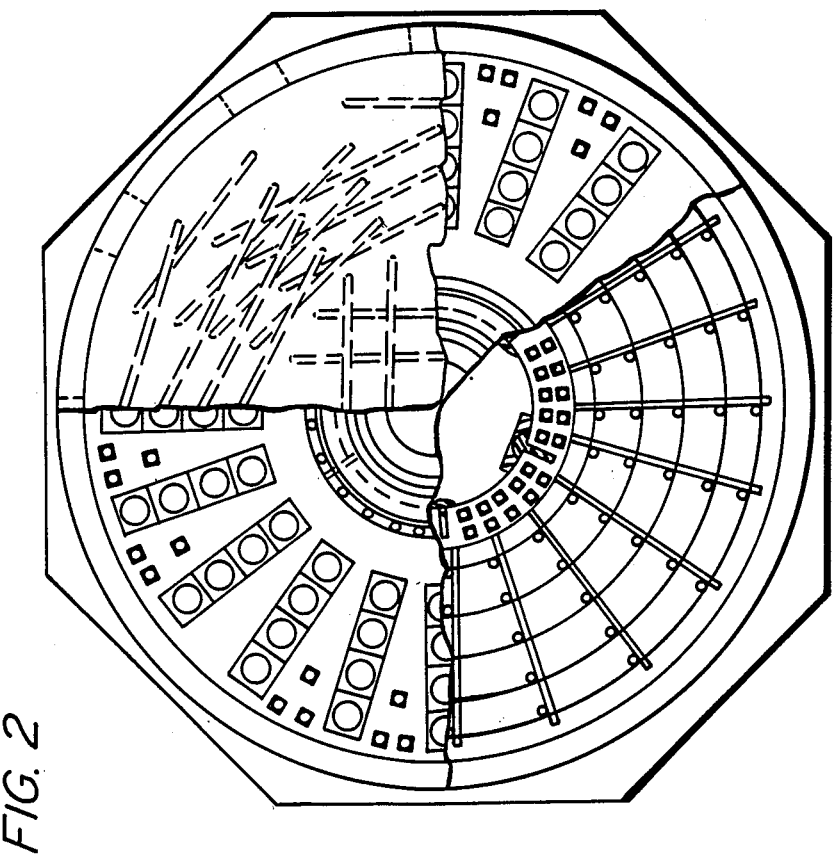
FIG. 2 is a plan view of the prestressed concrete pressure vessel of FIG. 1, with portions broken away and shown in section.

In FIG. 1, showing a PCPV as used in the earlier patent, the vessel dimensions and the values of external pressure $P_0$ and internal pressure $P_i$ are added.

The standard formulas or classical equations used to calculate TCS and TTS are as follows:

(TCS) Tangential Compression Stress due to:

$$P_0 = P_0 \frac{b^2(a^2 + r^2)}{r^2(b^2 - a^2)}$$

Where
$P_0$ is the external pressure by circumferential prestressing,
a is the internal radius of the wall of the vessel, b is the external radius of the wall of the vessel
r is the radius of an intermediate point in the vessel's wall.

(TTS) Tangential Tensile stress due to:

$$P_i = P_i \frac{a^2 (b^2 + r^2)}{r^2 (b^2 - a^2)}$$

where $P_i$ is the internal pressure.

FIG. 4 plots the stress curves for various design conditions and construction sequences. It shows:

1. The distribution of (J1) peak TCS, due to a $P_0$ of 5,294 psi, and (2) peak TTS, due to $P_i$ of 18,000 psi, without stress-relieving slots. The value of the peak TCS is 11,600 psi, and the value of each TTS is 21,400 psi. If the vessel is made of 5,000 psi strength concrete, the wall will have to be much thicker than twelve feet to lower the peak TCS to this level. But, then, it will also fall far short of the amount needed to resist the TTS of 21,400 psi, when $P_i$ is applied.

2. Introduction of a series of 24" deep SRS, spaced at 15°, has the effect of moving the peak TCS inwardly from the inner surface and lowering the peak TCS to 10,960 psi and the peak TTS to 15,400 psi. These values show effectiveness of the SRS in lowering peak stresses and moving them inwardly into the wall at the same time.

3. Although the stress gap between the peak TCS and TTS has been narrowed considerably by the slots, it is still about 4,000 psi. This would be about 2,500 psi over the permissible limit of, say, 1,500 psi.

4. The present invention is then used to close the gap to within the allowable limit of 1,500 psi or less over a distance of less than 12" across the wall, for example, by stressing a three-foot layer lying between the seven-foot and ten-foot radii. This is called "Layer (7 to 10)" in FIG. 4. This layer is stressed with its own $P_0$ of 1282 psi to achieve a maximum TCS of 5,000 psi at its inner surface at a radius of seven feet. The TCS due to this layered stressing is shown. Also shown is what remains of the tensile stress or stress gap that has to be resisted by rebars in the concrete. Since the maximum tensile stress is reduced to 1,500 psi maximum and tapers off to zero within a less than 12", it is no longer a problem in construction.

The Layered Construction Method, therefore, provides the designer with the ability to stress any layer in the wall to alleviate the design problems caused by an excessive difference between TCS and TTS. It is this technique that is disclosed and claimed herein.

CONSTRUCTION SEQUENCE

A decision for each case will have to be made in regard to the number, location and thickness of the layers that need to be constructed and stressed. In FIG. 4 the three-foot layer between a radius of seven feet and ten feet has to be stressed first, before the stressing of the entire vessel. This layer has therefore to be constructed before the rest of the vessel and stressed to achieve a tangential compressive stress at its inner surface of 5,000 psi. To achieve a safety factor of 1.5 (concrete strength of 7,500) during this construction stage, it is necessary to igh strength concrete, e.g., 6,000 psi, as well as utilizing the transformed section of the steel reinforcement that will provide another 1,500 psi, to make the required ultimate strength of 7,500 psi. The layer may be stressed by embedded tendons near the outer edge at a radius of ten feet.

After this layer is stressed, the rest of the PCPV is constructed, embedding the layer in the process. When completed, the entire vessel is stressed externally by surface-wound wires, as described in the earlier patent.

A typical construction sequence is shown in FIG. 7. It assumes, by way of example, that only one of the five layers shown is required to be constructed in advance. The layers are numbered in FIGS. 4–6 as layers 1, 2, 3, 4, and 5. In this example, layer 4 is the one to be constructed in advance. The steps, then, are 1. Construct layer 4, which is separated from the base by a sliding joint, and stress the layer 4 externally with a force $P_04$.

2. Connect the layer 4 with the base by concreting a connection.

3. Construct the remaining portion of wall, and stress it externally with force $P_0$.

Step 1 causes the TCS stress distribution shown in (1) below; step 2 causes the TCS distribution shown in (3) below; and the internal pressure, Pi, when applied causes the distribution of the TTS in (2) below:

(1) Tangential compressive distribution within the layer 4 under the external prestressing $P_04$.

(2) Tangential tensile strength distribution for the entire wall under the internal pressure $P_i$, with stress-relieving slots.

(3) Tangential compressive stress distribution for the entire wall under the external prestressing $P_0$, with stress-relieving slots.

(4) Combining (1), (2) and (3) results in causing the stress distribution in wall to lie within allowable limits.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A method for distributing the stresses in a thick-walled high-pressure vessel, so that they lie within allowable limits, comprising the steps of constructing the wall in a series of generally concentric layers, at least one intermediate layer of which is to be constructed before the other layers, constructing said one layer above a base, so that it rests on said base through a sliding joint, then stressing said one layer with an external prestressing pressure, thereafter connecting said one layer with the base by a rigid concrete connection, then constructing the remaining layers of said wall, and thereafter stressing the layered walls with an external prestressing pressure.

2. The method of claim 2 wherein there is the step of applying stress-relieving slots to the innermost layer of said wall, as part of said step of constructing the remaining layers.

3. The method of claim 1 in which additional layers are constructed before the remaining layers, each said additional layer being constructed as is said one layer.

4. A thick-walled high-pressure vessel, in which the stresses lie within allowable limits, including in combination a series of generally concentric layers including at least one preconstructed intermediate layer initially resting on a base through a sliding joint, and, after application of an external prestressing pressure, is secured to the base by a rigid concrete connection, the remaining layers of said wall being thereafter constructed and stressed with an external prestressing pressure.

5. The vessel of claim 4 wherein the innermost layer of said wall contains stress-relieving slots.

6. The vessel of claim 4 having additional preconstructed intermediate layers, constructed like said intermediate layer.

* * * * *

UNITED STATES PATENT AND TRADEMARK OFFICE
CERTIFICATE OF CORRECTION

PATENT NO. : 4,702,052
DATED : October 27, 1987
INVENTOR(S) : Philip Y. Chow

It is certified that error appears in the above-identified patent and that said Letters Patent are hereby corrected as shown below:

Column 1, line 17, delete "23".

Column 1, line 27, before "the inner" insert --at--.

Column 1, line 29, after "wall," insert --where--.

Column 1, line 37, after "concrete" insert --is--.

Column 1, line 45, "in" should read --into--.

Column 1, line 47, after "TCS" insert --inside--.

Column 1, line 58, after "wall" insert --to--.

Column 2, line 4, before "prestressed" insert --the--.

Column 3, line 26, after "show" insert --the--.

Column 3, line 46, before "less" insert --distance of--.

UNITED STATES PATENT AND TRADEMARK OFFICE
CERTIFICATE OF CORRECTION

PATENT NO. : 4,702,052
DATED : October 27, 1987
INVENTOR(S) : Philip Y. Chow

It is certified that error appears in the above-identified patent and that said Letters Patent are hereby corrected as shown below:

Column 3, line 65, "igh" should read --use high--.

Column 4, line 1, after "tendons" insert --located--.

Column 4, line 24, after "compressive" insert --stress--.

Signed and Sealed this

Twenty-fourth Day of May, 1988

Attest:

DONALD J. QUIGG

Attesting Officer

Commissioner of Patents and Trademarks